United States Patent [19]

Bernacchi et al.

[11] Patent Number: 4,910,028

[45] Date of Patent: Mar. 20, 1990

[54] HONEY COATED AND HONEY GLAZED ROASTED NUTS AND METHOD FOR PRODUCING SAME

[75] Inventors: Donald B. Bernacchi, Chicago, Ill.; Carol A. Yuknis, Highland, Ind.; Donna L. Immel, Downers Grove, Ill.

[73] Assignee: Griffith Laboratories U.S.A., Inc., Alsip, Ill.

[21] Appl. No.: 893,032

[22] Filed: Aug. 4, 1986

Related U.S. Application Data

[63] Continuation-in-part of Ser. No. 708,668, Mar. 6, 1985, abandoned.

[51] Int. Cl.[4] ................................................ A23L 1/36
[52] U.S. Cl. ...................................... 426/93; 426/293; 426/296; 426/309; 426/632
[58] Field of Search .................. 426/93, 89, 103, 272, 426/289, 293, 296, 303, 309, 632

[56] References Cited

U.S. PATENT DOCUMENTS

| | | | |
|---|---|---|---|
| 4,161,545 | 7/1979 | Green | 426/309 |
| 4,499,113 | 2/1985 | Mochizuki et al. | 426/103 |
| 4,515,820 | 5/1985 | Tang | 426/309 |
| 4,522,833 | 6/1985 | Sharma | 426/309 |
| 4,597,973 | 7/1986 | Moore | 426/93 |
| 4,647,463 | 3/1987 | Hoover | 426/293 |

*Primary Examiner*—Carolyn Paden
*Attorney, Agent, or Firm*—Hosier & Sufrin, Ltd.

[57] ABSTRACT

Methods of producing coated, roasted nuts with distinctive honey flavor and golden medium brown roasted nut color comprising coating the nuts a single or successive times with nut coater slurry containing spray dried honey powder, adhesive agent, supplemental sweetener and water, and optionally with a nut coater mixture of modified instant starch and baker's special sugar, and roasting, as well as roasted nuts produced by the described method.

20 Claims, No Drawings

HONEY COATED AND HONEY GLAZED ROASTED NUTS AND METHOD FOR PRODUCING SAME

This application is a continuation-in-part of U.S. Ser. No. 708,668 filed Mar. 6, 1985, now abandoned.

BACKGROUND OF THE INVENTION

This invention relates generally to methods for roasting nuts and, more particularly, to improved methods for producing roasted nuts having an adherent honey coating or glaze and a golden medium brown roasted nut color, and to the coated, roasted nuts produced by those methods.

There is a strong and constant consumer demand for honey coated and honey glazed roasted nuts having a distinctive honey flavor and a good roasted nut color. Unfortunately, it has been found that good quality honey coated or glazed nuts cannot be produced on a mass scale by simply coating the nuts with liquid honey and then roasting.

Honey, in its liquid, natural state, presents significant handling problems in mass production operations due to its viscosity and stickiness. These inherent handling problems are aggravated by variations in honey viscosity from batch to batch and by the limited shelf life of liquid honey and resulting crystallization of sugars in the honey over time. Thus, in order to apply high viscosity liquid honey on a mass production scale, it is often necessary to heat it to lower its viscosity. In addition, where crystallization is present, additional time consuming heating and agitation of the honey before application may also be required.

A yet more significant drawback to the use of liquid honey in coating nuts is the oil which is released and comes to the surface of the nut when it is roasted. Since the nut surface is not very porous, honey coating penetration is poor and hence the adherence of the honey coating is dependent almost exclusively on the honey bond to the nut surface. However, the bond to the nut is poor when liquid honey is used, because the oil which comes to the surface of the nut during roasting prevents good adhesion. The resulting poorly adherent honey coating is readily lost, particularly when the coated nuts rub against each other, as in shipping and handling of packaged nuts. Furthermore, liquid honey reacts with the nuts during roasting, imparting undesirable dark coloring and burned flavors to the final product.

Inherent in the general consumer demand for roasted nuts having a distinctive honey flavor and good roasted nut color, there is a significant demand for honey coated roasted nuts having a continuous durable, candy-like glazed coating which will withstand abusive handling without any significant loss of the honey coating. If such honey glazed nuts could be produced, they would be highly competitive with both conventional honey coated roasted nuts and conventional sugar glazed roasted nuts, providing a crunchier mouth feel and improved coating durability, flavor and taste. Furthermore, the improved continuous, durable coating would provide an improved barrier to oxidation and hence improved nut keeping qualities. Finally, if such a continuous, durable coating could be produced, the pickup of moisture by coated nuts would be reduced, desirably reducing stickiness between individual coated nuts.

It is therefore an object of the present invention to provide a method for producing roasted nuts having a honey coating or honey glaze in which the problems inherent in handling liquid honey are eliminated.

It is yet a further object of the present invention to provide honey coated roasted nuts with highly adherent coatings and, in one embodiment, to provide honey coated roasted nuts with a continuous, durable coating which will withstand particularly abusive handling.

Another object of the present invention is to provide a method of producing honey glazed roasted nuts with improved keeping qualities and reduced stickiness.

A further object of the present invention is to provide an improved economical method for producing roasted nuts having a distinctive honey flavor and a golden medium brown roasted nut color which are free of dark coloring and burned flavors.

These and other objects of the present invention will become apparent to those skilled in the art upon consideration of the accompanying specification and claims.

SUMMARY OF THE INVENTION

The present invention comprises a method for producing roasted nuts having an adherent honey coating or honey glaze, a distinctive honey flavor and a golden medium brown nut color. In one embodiment, the method of the invention entails coating the nuts with a nut coater slurry followed by a nut coater mixture, and then roasting. In another embodiment of the invention, twice coated nuts coated in accordance with the method of the first embodiment are subjected, prior to roasting, to a second application of nut coater slurry followed by a second application of the nut coater mixture. Finally, this invention is also directed to the coated, roasted nuts produced by the above methods.

The nut coater slurry used in the practice of the invention comprises a dry mixture of spray dried honey powder, an adhexive agent and a supplemental sweetener, slurried in water.

The honey powder of the nut coater slurry is a spray dried mixture of liquid honey solids and a spray drying carrier such as maltodextrin. The honey powder may also contain other sweetener solids such as high fructose corn syrup or glucose syrup, as well as other ingredients such as wheat starch, soy flour, calcium stearate and hydroxlyated lecithin. However, for purposes of formulating the dry mixture which is used to make the nut coater slurry, it is the level of honey solids which is of importance. Honey solids in commercially available honey powder useful in the practice of the present invention range from about 40 to about 65% by weight of the honey powder.

Typical honey powders comprising about 40 to 50% honey solids and 60 to 50% maltodextrin are available as commercial products from Borden's Consumer Products Division of Borden's Inc. of Columbus, Ohio (#"6312 Honey Flavoring Powder") from MCP Foods, Inc., of Anaheim, Calif. ("Powdered Honey") or from Ingredient Technology Corporation, Specialty Products Division, of New Jersey ("Dri-Flo Honey Buds 315-S soluble dried honey"). A honey powder comprising 55 to 65% honey with or without other sweetener solids such as high fructose corn syrup or glucose syrup, 20 to 25% wheat starch, 10 to 15% soy flour, 0.5% calcium stearate (antihumectant) and 0.5% hydroxlyated lecithin (as a processing aid) is available from Henkel Corporation, Food Ingredients Division of Minneapolis, Minnesota as "Honi-Bake dried honey powder", "Honi-Bake 705 dried honey powder" and "Honi-Bake C dried honey and sweetener powder". A spray dried honey comprising 40% honey solids, 31% maltodextrin, 28.5% wheat starch and 0.5% calcium stearate available from Jewell/Barksdale Associates of Berkeley, Ill. as "Hon-eze spray dried honey".

Once the honey powder is chosen and its honey solids level determined, a sufficient amount of the powder must be used in the dry mixture which is used to make the nut coater slurry to provide a honey solids level of from about 12% to about 52% by weight, more preferably from about 16 to about 39% by weight and most preferably from about 18% to about 30% by weight of the dry mixture.

The adhesive agent is preferably tapioca dextrin. In the embodiment of the invention where a single application of nut coater slurry/nut coater mixture is used, the tapioca dextrin should be present in the dry mixture at a level of from about 10 to 80% by weight, more preferably at a level of from about 20 to 50% by weight and most preferably at a level of from about 30 to 40% by weight. In the embodiment of the invention ("the double application embodiment") where the initial nut coater slurry/nut coater mixture application is followed, prior to roasting, with a second application, the tapioca dextrin should be present in the dry mixture at a level of from about 5 to 70% by weight, more preferably at a level of from about 5 to 35% by weight and most preferably at a level of about 10 to 20% by weight.

Tapioca dextrin can be replaced in the mixture by other dextrins and starch derivatives including maltodextrin, modified food starch from corn, tapioca or wheat, as well as vegetable gums of varying polymer types such as gum arabic, xanthan, guar, carrageenan, and cellulose derivatives which may be used singularly or in combination. When these alternative adhesive agents are used, optimum use levels will parallel those of tapioca dextrin subject to slight adjustment based upon the particular adhesion characteristics each imparts. Tapioca dextrin however, is the most desirable adhesive agent due to its bland flavor, the slight bodying characteristics which it imparts to the slurry, its ability to promote adhesion of the nut coater to the nuts and its lack of browning potential.

The supplemental sweetener is preferably brown sugar powder. In the single application embodiment of the invention, the supplemental sweetener is included in the dry mixture at a level of from 10 to 80% by weight, more preferably at a level from 20 to 50% by weight and most preferably at a level of from 30 to 40% by weight. In the "double application" embodiment, the supplemental sweetener is included in the dry mixture at a level of from about 0 to 70%, more preferably at a level of about 5 to 35% and most preferably at a level of from about 10 to 20% by weight. While brown sugar powder is preferred as the supplemental sweetener, similar carbohydrates can alternatively serve as the supplemental sweetener such as white sugar, maple sugar or molasses powder. Brown sugar powder is preferred, however, because it contributes most favorably to flavor and the desired level of browning.

The nut coater slurry is made by combining the dry mixture of spray dried honey powder, tapioca dextrin and brown sugar powder into a uniform dry mixture and then adding, with agitation, from about 25 to 60% water, preferably maintained in a temperature range of about 60° to 150° F., to provide a homogeneous mixture of the nut coater slurry. Preferably, 50% by weight water will be used dropping the honey solids level in the slurry to a broad range of about 6% to about 26% by weight, to a preferred range of about 8 to about 19.5 and to a most preferred range of about 9 to about 15% by weight of the slurry. When 25% by weight water is used, the maximum honey solids level in the slurry will be 39% by weight and when 60% by weight water is used, the minimum honey solids level in the slurry will be about 4.8% by weight. Although less preferable, the slurry may also be made by individually combining the dry ingredients with the water.

Flavoring compounds to enhance or compliment the honey flavor optionally may be present in the nut coater at a level of typically from 0.2 to 1% by weight so long as they are heat stable so that they can withstand subsequent roasting. Typical such flavoring compounds include citrus, wine, spice oils and the like. In addition, salt may be incorporated in the dry mixture used in making the nut coater slurry, particularly where the final coated product will not carry an exterior salt containing coating. Where salt is incorporated in the dry mixture, it can range from about 2 to 20% by weight of the mixture, more preferably about 5 to 15% by weight and most preferably from about 8 to 12% by weight of the mixture.

The nut coater mixture which is applied following the nut coater slurry comprises modified instant starch and bakers special sugar. The modified instant starch is present at a level of from about 8 to 22% by weight, more preferably from about 10 to 20% by weight and most preferably from about 13 to 16% by weight. The bakers special sugar is present at a level from about 78 to 92% by weight, more preferably from 80 to 90% by weight and most preferably from 84 to 87% by weight. The bakers special sugar preferably has a typical grain size as measured by U.S. Series screens of 3% maximum on a U.S. 40 screen and 20% maximum through as U.S. 140 screen. The modified instant starch preferably has a particle size of 45% on a U.S. 200 screen and 55% through a U.S. 200 screen.

In accordance with one preferred method of the present invention, raw nuts are coated with the nut coater slurry followed by the nut coater mixture and then the twice coated nuts are roasted. The nut coater slurry is applied by spraying the slurry onto the nuts or by other conventional techniques such as by spraying the slurry onto the nuts in a revolving or tumbling coating pan in which the nuts are tumbling and to which the nut coater mixture is added while tumbling continues.

In this embodiment of the invention, the nut coater slurry is applied at a rate, based on the weight of the nuts, of from 3 to 13% by weight, more preferably at a rate of from 3 to 10% and most preferably from 3 to 7% by weight. The nut coater mixture is applied at a level of from about 5 to 12% by weight, based on the weight of the nuts, (before application of the slurry), more preferably from about 6 to 11% by weight and most preferably from about 7 to 11% by weight, with the limiting factor being the amount of nut coater mixture that will actually adhere to the nuts.

The twice coated nuts may be roasted by conventional oil roasting for from about 2 to 7 minutes at from about 300° to 400° F. and more preferably from about 3 to 6 minutes at 335° to 365° F. or by conventional dry roasting at from about 300° to 400° F. for from 4 to 10 minutes or, more preferably, at from about 350° to 400° F. for about 5 to 10 minutes. However, it must be noted that roasting times and temperatures will vary depending on the type and condition of the nuts being coated.

For instance, peanuts which have already been roasted with or without blanching and coated as has been described are preferably flash oil roasted in the practice of the present invention for about 10 to 40 seconds at about 350° to 400° F. Also, previously roasted nuts can be treated in accordance with the present invention, in which case they should be dry roasted at about 400° F. for 5–10 minutes, after coating.

The present method can be used with peanuts, cashews, almonds, pecans and other edible nuts. The nuts may be coated and roasted both with and without skins, where applicable, although shells must in all cases be removed before coating.

A nut sprinkle may be applied to the nuts after roasting. The nut sprinkle is applied at a level of about 1% by weight of nuts. A typical nut sprinkle would include about 75% by weight bakers special sugar and 25% salt. Other flavorings could be imparted to the roasted product by using other nut sprinkles after roasting.

In an important alternative embodiment of the present invention, a glazed coating is obtained by making a second application of the nut coater slurry/nut coater mixture, before the nuts are roasted. In this embodiment, the nut coater slurry and the nut coater mixture are applied at the rates described above in connection with the first embodiment of the invention. The nut coater slurry is then applied a second time at a level of from about 3 to 13% by weight, more preferably at a rate of from 3 to 10% by weight, and most preferably at a rate of about 5% by weight. Finally, the nut coater mixture is also applied a second time, at a level of from about 7 to 20% by weight, more preferably from about 10 to 18% by weight and most preferably at a level of about 15% by weight. Then the nuts, which have thus been coated four times, are roasted by conventional oil roasting, by conventional dry roasting or by flash oil roasting, all as described above with respect to the twice coated nuts.

The resulting product has a continuous, durable, candy-like honey glaze coating which withstands abusive handling without significant loss of the coating, even under agitation or other abusive handling conditions. In fact, these honey glazed nuts have improved mouth feel, flavor and taste, compared to both conventional honey nuts and sugar glaze nuts. In addition, the honey glazed nuts have reduced stickiness when compared to conventional sugar glazed coated nuts. Finally, a yet thicker, crunchier coating can be obtained by further repeating the application of the nut coater slurry and nut coater mixture before roasting.

In the practice of the above embodiment of the invention, it is preferred but not required that the honey solids level in the nut coater slurry be adjusted to about 8 to 16% by weight and most preferably to about 12% by weight.

Additional salt may be incorporated into the honey glaze coating of this embodiment of the invention, as an alternative to the application of a nut sprinkle, as described above in connection with the first embodiment of the invention. When it is desired to introduce salt in this way, it may be added to the dry mixture used in preparing the slurry, at a level of about 2 to 20% by weight, more preferably at a level of from about 5 to 15% by weight, and most preferably from about 8 to 12% by weight. Naturally, other flavors could be imparted to the glazed nut by similarly incorporating those flavors in the nut coater slurry. Alternatively, salt as well as any other flavors could be incorporated in the nut coater mixture rather than the nut coater slurry.

The following examples are intended to illustrate the practice of the present invention. They are not, however, intended to be exhaustive or limiting of the invention.

EXAMPLES

1. The importance of each of the components of the nut coater was examined by replacing various of the components, with results as set forth in Table I below. Both raw and previously dry roasted nuts were used. The coating process was conducted as follows:

A. One part by weight of a series of nut coater formulations as set forth in Table I was mixed with one part by weight water to form a slurry which was then applied to the nuts by spraying at a level of about 5% by weight.

B. A nut coater comprising 15% by weight modified instant starch and 85% bakers special sugar was then applied to the nuts at a 10% by weight level.

C. The twice coated nuts, both with and without skins, were then roasted in oil or hot air until the desired roast was obtained. Where the nuts used were previously dry roasted, after coating they were flash oil roasted for 30 seconds 400° F. and alternatively dry roasted at the same temperature for 5 minutes. Where raw nuts were used, after coating they were roasted in oil at 350° F. for 3 minutes.

D. The nuts were allowed to cool and a nut sprinkle comprising 75% by weight bakers special sugar and 25% by weight fine salt was then applied to the nuts at a 1% by weight level.

Run 1 (Table I) represents roasted nuts produced in accordance with the present invention in which the spray dried honey solids is at a level of 16% by weight and no liquid honey is utilized. The roasted nuts produced in this run exhibited the desired good honey flavor and golden medium brown roasted nut color.

In Run 2, the honey solids were replaced by maltodextrin without altering any of the other components of the mixture. This composition produced the desired golden medium brown roasted nut color, but not the desired honey flavor.

In Run 3, the honey solids and maltodextrin were replaced with tapioca dextrin, again producing good color but not the desired honey flavor.

In Run 4, the honey solids and maltodextrin were replaced with bakers special sugar, producing good color without the desired honey flavor.

In Run 5, the honey solids and maltodextrin were replaced by liquid honey, producing undesirable brown color and burned flavor.

Finally, in Run 6, 100% of liquid honey was used resulting in a very burned flavor and a dark brown nut.

| Run | Spray Dried Honey* | Tapioca Dextrin | Brown Sugar Powder | Bakers Special Sugar | Liquid Honey | Malto Dextrin | Honey Flavor | Color |
| --- | --- | --- | --- | --- | --- | --- | --- | --- |
| 1 | 16 | 30 | 30 | | | 24 | yes | good** |

-continued

| Run | Spray Dried Honey* | Tapioca Dextrin | Brown Sugar Powder | Bakers Special Sugar | Liquid Honey | Malto Dextrin | Honey Flavor | Color |
|---|---|---|---|---|---|---|---|---|
| 2 | | 30 | 30 | | | 40 | none | good |
| 3 | | 70 | 30 | | | | none | good |
| 4 | | 30 | 30 | 40 | | | none | good |
| 5 | | 54 | 30 | | 16 | | burned | brown |
| 6 | | | | | 100 | | very burned | dark brown |

*honey solids of mixture of 40% dried honey and 60% maltodextrin (listed separately at right)
**indicates golden medium brown nut color 2. Coated, roasted nuts having a continuous, durable, candy-like honey glaze coating were prepared in accordance with the present invention as follows:

First, a nut coater slurry was prepared by combining a dry mixture of spray dried honey powder, tapioca dextrin, brown sugar powder and salt into a uniform dry mixture and then adding water, with agitation, to provide a homogeneous mixture of the nut coater slurry. The respective levels of the ingredients in the dry mixture and in the slurry, in percentages by weight, were as follows:

| Ingredient | Slurry | Dry Mixture |
|---|---|---|
| spray dried honey (honey solids) | 30 (12) | 60 (24) |
| tapioca dextrin | 7.5 | 15 |
| brown sugar powder | 7.5 | 15 |
| salt | 5.0 | 10 |
| water | 50 | |

A nut coater mixture was prepared by combining modified instant starch and bakers special sugar into a uniform dry mixture, with the levels of the ingredients in the mixture, in percentages by weight, as follows:

| modified instant starch | 15 |
|---|---|
| bakers special sugar | 85 |

Both raw and previously dry roasted nuts were then coated successively with the slurry and the mixture by spraying the slurry onto the nuts follwed by the nut coater mixture, followed by yet another spray application of the slurry and a final application of the nut coater mixture. The application rates (in percentages by weight) were as follows:

| first slurry application | 5% by weight |
|---|---|
| first nut coater mixture application | 10% by weight |
| second slurry application | 5% by weight |
| second nut coater mixture application | 15% by weight |

Where the nuts used were previously dry roasted, after coating they were flash oil roasted for 30 seconds at 400° F. and alternatively dry roasted at the same temperature for 10 minutes. Where raw nuts were used, after coating they were roasted in oil at 350° F. for 3 minutes.

The resulting coated nuts had a continuous, durable, candy-like glaze coating and had an improved mouth feel, flavor and taste, compared to both conventional honey roasted nuts and sugar glaze nuts. In addition, the honey glazed nuts had reduced stickiness when compared to conventional sugar glazed nuts invention.

3. The durability of the honey glazed nuts produced in example 2 above was then compared with the durability of the coatings of commercially available honey coated nuts (Planter's Honey Roasted Peanuts) and commercially available conventional sugar glazed nuts (Planter's Sweet and Crunchy Peanuts).

A Ro-Tap testing sieve shaker Model B manufactured by W.S. Tyler, Inc./Combustion Engineering, Inc. of Mentor, Ohio was used in the test. The sieve used in the test was a U.S. Series No. 5 screen.

6 oz. samples of each of the three types of coated nuts were successively placed on the screen and shaken for 5 minutes. The loss of coating was determined by the change in weight of the nuts prior to and after the shaking procedure. The results obtained were as follows:

| | Honey Glazed | Commercial Conventional Glazed | Commercial Honey Roasted |
|---|---|---|---|
| Average Loss of Weight | 0.49% | 2.49% | 1.45% |

In addition, the physical appearance of each of the nuts was examined, and it was noted that the conventional sugar glazed nuts displayed bare patches of the underlying nut surface from which their coatings had been entirely lost, whereas the honey glazed nuts had virtually no bare nut surface exposed.

These results demonstrate the outstanding adherence and durability of the honey glazed coating of the present invention.

While the present invention is described above in connection with preferred or illustrative embodiments, these embodiments are not intended to be exhaustive or limiting of the invention. Rather, the invention is intended to cover any alternatives, modifications or equivalents that may be included within its sphere and scope, as defined by the appended claims.

The present invention is claimed as follows:

1. A method for producing roasted nuts having an improved honey coating comprising:
   coating nuts with a nut coater slurry prepared from a dry ingredient component including from about 12 to 52% by weight of spray dried honey solids, from about 10 to 80% by weight of an adhesive agent and from about 10 to 80% by weight of a supplemental sweetener selected from the group consisting of brown sugar powder, white sugar, maple sugar and molasses powder, said dry ingredient component being combined with from about 25 to 60% by weight water to produce said nut coater slurry;
   applying a nut coater mixture of from about 8 to 22% by weight modified instant starch and from about 78 to 92% by weight bakers special sugar; and
   roasting the twice coated nuts.

2. The method of claim 1 wherein the ingredients of said dry ingredient component are formed into a uniform mixture and then added, with agitation, to said water, to provide said nut coater slurry.

3. The method of claim 1 wherein the ingredients of said dry ingredient component are individually combined with said water to provide said nut coater slurry.

4. The method of claim 1 wherein said adhesive agent is tapioca dextrin and said supplemental sweetener is brown sugar powder.

5. The method of claim 1 wherein, said dry ingredient component of said nut coater slurry includes said spray dried honey solids in the range of about 18 to 30% by weight, said tapioca dextrin in the range of about 10 to 20% by weight, said brown sugar powder in the range of about 10 to 20% by weight, and said water at a level of about 50% by weight, and said nut coater mixture includes said modified instant starch in the range of about 8 to 22% by weight and said bakers special sugar in the range of about 78 to 92% by weight.

6. The method of claim 1 wherein said nut coater slurry is applied to the nuts at a rate of from about 3 to 13% by weight and said nut coater mixture is applied to the nuts at a level of from about 5 to 12% by weight.

7. The method of claim 1 wherein said nut coater slurry is applied to the nuts at a rate of from 3 to 7% by weight and said nut coater mixture is applied to the nuts at a level of from about 7 to 11% by weight.

8. The method of claim 1 wherein said roasting step is conducted by roasting in oil at a temperature of about 300° to 400° F.

9. The method of claim 1 wherein said roasting step is conducted by passing the nuts through air currents in a temperature range of about 300° to 400° F.

10. The method of claim 1 wherein a nut sprinkle is applied to the nuts after roasting, said nut sprinkle comprising about 25% by weight salt and about 75% by weight bakers special sugar.

11. A method for producing roasted nuts having a continuous, durable, candy-like glaze coating comprising:
coating nuts with a nut coater slurry prepared from a dry ingredient component including from about 12 to 52% by weight of spray dried honey solids, from about 5 to 70% of an adhesive agent, and from about 0 to 70% by weight of a supplemental sweetener selected from the group consisting of brown sugar powder, white sugar, maple sugar and molasses powder, said dry ingredient component being combined with from about from 25 to 60% by weight water to produce said nut coater slurry;
applying a nut coater mixture of from about 8 to 22% by weight modified instant starch and from about 78 to 92% by weight bakers special sugar;
coating the nuts with said nut coater slurry a second time;
applying said nut coater mixture a second time; and
roasting the resulting coated nuts.

12. The method of claim 11 wherein the ingredients of said dry ingredient component are formed into a uniform mixture and then added, with agitation, to said water, to provide said nut coater slurry.

13. The method of claim 11 wherein the ingredients of said dry ingredient component are individually combined with said water to provide said nut coater slurry.

14. The method of claim 11 wherein said adhesive agent is tapioca dextrin and said supplemental sweetener is brown sugar powder.

15. The method of claim 14 wherein, said dry ingredient component of said nut coater slurry includes said spray dried honey solids in the range of about 8 to 16% by weight, said tapioca dextrin in the range of about 10 to 20% by weight and said brown sugar powder in the range of about 10 to 20% by weight, salt in the range of about 8 to 12% by weight and said water at a level of about 50% by weight, and said nut coater mixture includes said modified instant starch in the range of about 8 to 22% by weight and said bakers special sugar in the range of about 78 to 92% by weight.

16. The method of claim 11 wherein said nut coater slurry initially is applied to the nuts at a rate of from about 3 to 13% by weight, said nut coater mixture initially is applied to the nuts at a level of from about 5 to 12% by weight, said nut coater slurry is then applied a second time at a rate of from about 3 to 13% by weight and said nut coater mixture is then applied a second time at a rate of from about 7 to 20% by weight.

17. The method of claim 11 wherein said nut coater slurry initially is applied to the nuts at a rate of from about 3 to 7% by weight, said nut coater mixture initially is applied to the nuts at a level of from about 7 to 11% by weight, said nut coater slurry is then applied a second time at a rate of from about 5% by weight and said nut coater mixture is then applied a second time at a rate of about 15% by weight.

18. The method of claim 11 wherein said roasting step is conducted by roasting in oil at a temperature of about 300° to 400° F.

19. The method of claim 11 wherein said roasting step is conducted by passing the nuts through air currents in a temperature range of about 300° to 400° F.

20. Honey glazed roasted nuts prepared by:
coating nuts with a nut coater slurry prepared from a dry ingredient component including from about 12 to 52% by weight of spray dried honey solids, from about 5 to 70% by weight of an adhesive agent, from about 0 to 70% by weight of a supplemental sweetener selected from the group consisting of brown sugar powder, white sugar, maple sugar and molasses powder, said dry ingredient component being combined with from about from 25 to 60% by weight water;
applying a nut coater mixture of from about 8 to 22% by weight modified instant starch and from about 78 to 92% by weight bakers special sugar;
coating the nuts with said nut coater slurry a second time;
applying said nut coater mixture a second time; and
roasting the resulting coated nuts.

* * * * *